United States Patent
Sittler et al.

(10) Patent No.: US 7,503,220 B2
(45) Date of Patent: Mar. 17, 2009

(54) PRESSURE SENSOR USING NEAR NET SHAPE SINTERED CERAMICS

(75) Inventors: Fred Charles Sittler, Excelsior, MN (US); Carl Raymond Gansen, Belle Plaine, MN (US)

(73) Assignee: Rosemount Inc., Eden Prairie, MN (US)

( * ) Notice: Subject to any disclaimer, the term of this patent is extended or adjusted under 35 U.S.C. 154(b) by 0 days.

(21) Appl. No.: 11/789,443

(22) Filed: Apr. 24, 2007

(65) Prior Publication Data

US 2007/0245829 A1    Oct. 25, 2007

Related U.S. Application Data

(60) Provisional application No. 60/794,813, filed on Apr. 25, 2006.

(51) Int. Cl.
   *G01L 7/08*    (2006.01)
(52) U.S. Cl. ....................................................... 73/715
(58) Field of Classification Search ................... 73/715, 73/718
   See application file for complete search history.

(56) References Cited

U.S. PATENT DOCUMENTS

| | | | |
|---|---|---|---|
| 4,520,116 A | | 5/1985 | Gentilman et al. |
| 4,934,193 A | * | 6/1990 | Hayata ........................ 73/727 |
| 5,201,228 A | * | 4/1993 | Kojima et al. ................ 73/724 |
| 5,731,522 A | | 3/1998 | Sittler |
| 6,473,711 B1 | | 10/2002 | Sittler et al. |
| 6,520,020 B1 | | 2/2003 | Lutz et al. |
| 6,843,133 B2 | | 1/2005 | Broden et al. |
| 6,848,316 B2 | | 2/2005 | Sittler et al. |
| 6,907,790 B2 | | 6/2005 | Orth et al. |

OTHER PUBLICATIONS

Internet pages entitled "Aluminum oxynitride" at http://en.wikipedia.org/wiki/ALON viewed Apr. 24, 2006 (2 pages).
Lundin, L., "Air Force testing new transparent armor", Internet article at http://www.af.mil/news/story_print.asp?storyID=123012131 viewed Apr. 24, 2006 (2 pages).

* cited by examiner

*Primary Examiner*—Andre J Allen
(74) *Attorney, Agent, or Firm*—Kinney & Lange, P.A.

(57) ABSTRACT

A capacitive pressure sensor is formed with sensor body and diaphragm components made of near net shapeable sintered ceramic. In one configuration, the differential pressure sensor has two sintered ceramic cell halves with an internal sintered ceramic diaphragm captured between the two cell halves. In another configuration, two side-by-side sintered ceramic cell halves have individual sintered ceramic diaphragms, and the chambers of the two cell halves are connected by metal tubing.

25 Claims, 1 Drawing Sheet

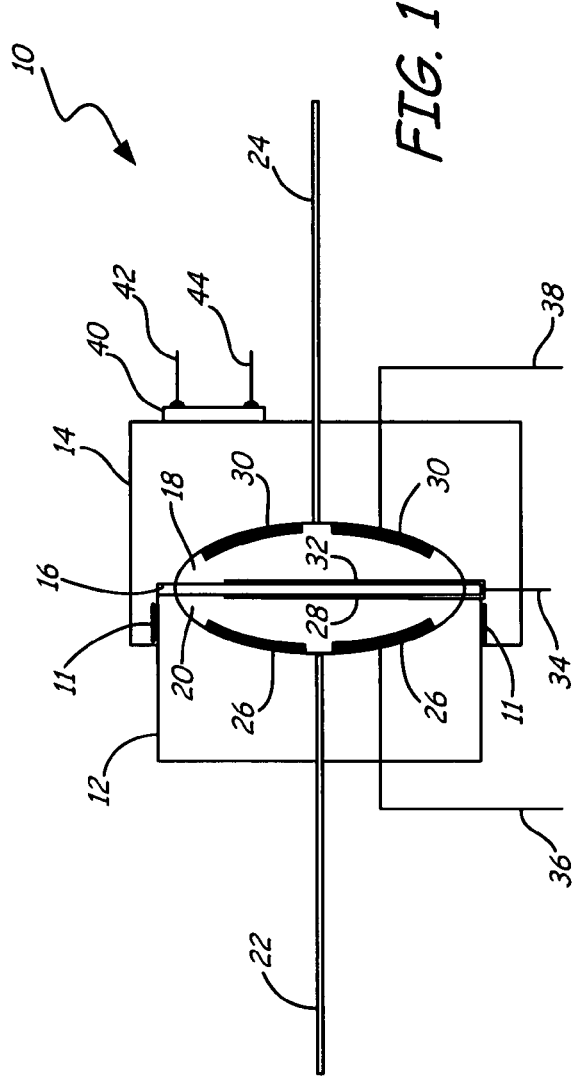
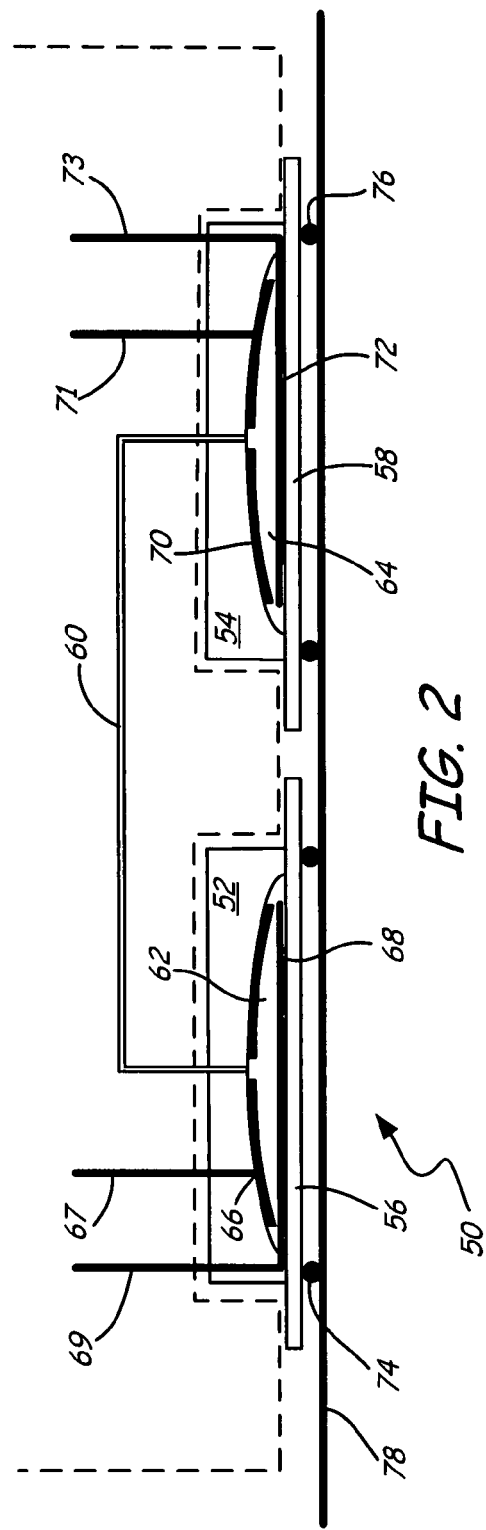

PRESSURE SENSOR USING NEAR NET SHAPE SINTERED CERAMICS

CROSS-REFERENCE TO RELATED APPLICATION(S)

This application claims priority from U.S. provisional patent application Ser. No. 60/794,813, filed Apr. 25, 2006, which is incorporated by reference.

BACKGROUND

The present invention relates to pressure sensors. In particular, the invention relates to capacitive pressure sensors having cell body and diaphragm components made of sintered ceramics fired to near net shape to minimize expensive machining operations.

Capacitive pressure sensors have found widespread use in industrial process, aerospace, and other control and monitoring systems. Capacitive pressure sensing cells can be configured to sense absolute pressure, gauge pressure, differential pressure, or combinations of those pressures.

In some cases, capacitive pressure sensors are used to measure pressure of fluids that may be corrosive to metal parts of the sensor. One technique used to address this issue is to separate the pressure sensor from the process fluid using an isolation diaphragm. An oil fill then couples the pressure sensor to the isolation diaphragm, so that pressure applied to the isolation diaphragm is transferred through the oil fill to the diaphragm of the capacitive pressure sensor. This isolation technique, however, can introduce errors in pressure measurements.

Capacitive pressure sensors have been fabricated from a variety of materials, such as metal, glass, sapphire, and silicon. There is a continuing need for improvements to capacitive pressure sensors (and in particular differential pressure sensors) to provide smaller sensors, which use lower oil fill volumes, and which are less expensive to fabricate.

SUMMARY

A pressure sensor uses near net shape sintered ceramics for the cell bodies and diaphragms. Desired materials for this application are sintered ceramics that exhibit a low Young's modulus with high fracture toughness. Metallic parts, such as pressure tube and electrical connectors can be incorporated into the sintered ceramic components before or after they are fired.

BRIEF DESCRIPTION OF THE DRAWINGS

FIG. 1 is a cross-sectional view of a differential pressure cell formed by two sintered ceramic cell halves and a sintered ceramic center diaphragm.

FIG. 2 is a cross-sectional view of a differential pressure cell including two sintered ceramic cell halves in side-by-side arrangement, with a separate sintered ceramic diaphragm for each cell half.

DETAILED DESCRIPTION

FIG. 1 is a cross-sectional view of differential pressure sensor 10 formed by cell halves 12 and 14 and diaphragm 16. Cell halves 12 and 14 and diaphragm 16 are formed of near net shape sintered ceramic.

In the embodiment shown in FIG. 1, cell half 12 and diaphragm 16 form first chamber 18, while cell half 14 and diaphragm 16 define second chamber 20. Metal tubing 22 extends through cell half 12 to provide fluid under pressure to chamber 18. Similarly, metal tube 24 extends through cell half 14 to provide a fluid connection to chamber 20. The cell halves are joined by braze joints 11. Capacitive plate 26 on the wall of chamber 18 and plate 28 on the face of diaphragm 16 exposed to chamber 18 form a first capacitor C1. Plate 30 on the wall of chamber 20 and plate 32 on the face of diaphragm 16 facing chamber 20 form a second capacitor C2.

Metallic parts such as tubing 22 and 24 can be brazed into the ceramic components as the components are fired or can be added after firing. Similarly, electrical conductors can be braised into the ceramic material during or after firing. FIG. 1 shows conductor 34, which provides connection between plates 28 and 32 on diaphragm 16 and the exterior of sensor 10. Conductor 34 can be inserted in an etched channel in cell half 14, and can be held in place and sealed using a glass frit. This also can be a part of the firing process for the ceramic components. Conductor 36 provides connection between plate 26 and the exterior of sensor 10. Conductor 38 provides connection between plate 30 and the exterior of sensor 10.

Depending upon the pressure difference between the fill fluid in chamber 18 and the fill fluid in chamber 20, diaphragm 16 will deflect to change the relative capacitances of the first and second capacitors. Signal processing circuitry (not shown) converts the capacitances C1 and C2 into a measurement value that is representative of the differential pressure.

Temperature sensor 40 can be attached to pressure sensor 10. Temperature sensor 40 can be a thick film thermocouple or similar device. Leads 42 and 44 connect temperature sensor 40 to the signal processing circuitry. As shown here, temperature sensor 40 is affixed to the outside of pressure sensor 10. It could also be applied to interior surfaces.

The use of sintered ceramic as the material forming cell halves 12 and 14 and diaphragm 16 offer significant advantages. First, the components can be fabricated using a near net shapeable fabrication process. The ceramic component is formed in a green state to the desired shape from pressed, cast or molded powder. It then is densified by firing (heating in a furnace), or by using microwave energy. The resulting sintered ceramic components have essentially the finished shape and dimensions of the final product. Because the fabrication is done using near net shapeable processing, only surface finishing (i.e. grinding) is required to obtain the desired physical dimensions.

Although brazing is shown as the connection between cell halves 12 and 14, fusion bonding offers a technique by which even tighter tolerances can be obtained. In fusion bonding, cell halves 12 and 14 are clamped together, so that the ceramic material of each component fuses with the material in the other component. In order to maintain the fusion bond under compression, a metal clamp having a higher rate of shrinkage than the ceramic material can be placed over the region where the two components are being bonded. As the structure cools to room temperature, the clamp maintains the fusion bond under compression.

One example of a preferred sintered ceramic is an aluminum oxynitride spinel designated ALON®, a transparent form of aluminum oxynitride, produced by Surmet Corporation, Burlington, Mass. ALON® has been developed as a new form of transparent armor. It is described, for example, in U.S. Pat. No. 4,520,116. Other ceramics suitable for pressure sensor applications include other aluminum oxynitride spinels, magnesium aluminate spinel, aluminum oxide, and yttrium stabilized, partially stabilized zirconia, (PSZ). Preferred mechanical properties of sintered ceramic pressure sensor diaphragms are fracture toughness exceeding about 1.5 MPa m$^{-1/2}$ and elastic moduli below about 350 GPa (50.8×10 psi). These and other oxide ceramics are near net shapeable by forming powders containing suitable binders into shapes by pressing or casting in molds or by using rapid prototyping/ solid free form manufacturing processes. Following forming, the parts are fired to reach the final dense near net shape using commonly accepted ceramic processing practice. Isostatic pressing may also be used to densify the green unfired shapes. The parts may be fired separately, and assembled by braising metalized joints together, or they may be metalized in the green state and fired in a single operation with all electrical leads and capacitive electrodes deposited before firing. In certain cases, the parts may be processed using microwave energy.

FIG. 2 shows differential pressure sensor 50, which has a side-by-side configuration, rather than a back-to-back configuration as shown in FIG. 1. Differential pressure sensor 50 includes cell halves 52 and 54 and diaphragms 56 and 58, which form two, side-by-side, individual capacitor sensor cells. Metal tubing 60 connects chambers 62 and 64.

Capacitor plate 66 on the wall of chamber 62 and capacitor plate 68 on the inner wall of diaphragm 56 form first capacitor C1. Conductor 67 provides connection between capacitor plate 66 and the exterior of sensor 50. Conductor 69 provides connection between capacitor plate 68 and the exterior of sensor 50.

Similarly, capacitor plate 70 on the inner wall of chamber 64 and capacitor plate 72 on the inner wall of diaphragm 58 form second capacitor C2. Conductor 71 provides connection between capacitor plate 70 and the exterior of sensor 50. Conductor 73 provides connection between capacitor plate 72 and the exterior of sensor 50.

O-rings 74 and 76 provide seals between diaphragms 56 and 58 and plate 78. Fluid is introduced between plate 78 and each of the diaphragms 56 and 58. The fluid may be a fill fluid that transmits pressure from an isolation diaphragm, or may be the process fluid itself.

The metal components, such as capacitor plates 66, 68, 70, and 72, are not exposed to the fluid applying pressure to deflect diaphragms 56 and 58. Therefore, the side-by-side configuration of differential pressure sensor 50 offers the option of eliminating an isolation diaphragm.

The O-rings 74 and 76 are mounted into grooves in the outer surface of diaphragms 56 and 58. Those grooves are formed during the shaping process of the green ceramic into diaphragms 56 and 58.

The near net shape sintered ceramic pressure sensors also allow fabrication of temperature sensors as part of the fabrication process. A metallic temperature sensor material can be metallized onto inner or outer surfaces of cell halves 12 or 14 of FIG. 1 or cell halves 52 and 54 of FIG. 2. By forming the temperature sensor in a metallization step, an expensive separate part can be eliminated.

The side-by-side configuration shown in FIG. 2 also offers the potential of allowing both line pressure and differential pressure to be measured. This can be achieved with a size reduction of the overall sensor, and with the option of a structure that does not require isolation diaphragms and an oil fill.

The invention is well suited to batch fabrication, but does not require complex machining, or the exotic facilities, chemicals, and specialty safety requirements associated with semiconductor type batch fabrication.

Although the present invention has been described with reference to preferred embodiments, workers skilled in the art will recognize that changes may be made in form and detail without departing from the spirit and scope of the invention.

The invention claimed is:

1. A sensor comprising a sensor body and a deflectable component mounted to the sensor body, the deflectable component responsive to a parameter to be sensed and characterized by the sensor body and the sensor body and the deflectable component being formed of sintered ceramic comprising at least one of aluminum oxynitride spinel and magnesium aluminate spinel.

2. The sensor of claim 1, wherein the parameter to be sensed is pressure and wherein the sensor body and the deflectable component define at least one pressure sensing chamber.

3. The sensor of claim 2, wherein the sensor comprises a capacitive differential pressure sensor and wherein the deflectable component comprises a central diaphragm positioned between a first chamber and a second chamber, the central diaphragm being deflectable as a function of fluid pressure in the first and second chambers.

4. The sensor of claim 3, wherein the first and second chambers are filled with fluid that transmits pressure to the first and second chambers respectively.

5. The sensor of claim 1, wherein the sensor body comprises:
a first portion with a chamber and a second portion with a chamber;
wherein the first portion extends into and is attached to the second portion; and
wherein the deflectable component is mounted between the first portion chamber and the second portion chamber.

6. The sensor of claim 5, wherein the first portion with a chamber, the second portion with a chamber and the deflectable component are formed of near net shape sintered ceramics.

7. The sensor of claim 1, wherein the sintered ceramic comprises a ceramic material with an elastic modulus of less than about 350 GPa 50.8×10$^6$ psi and fracture toughness greater than about 1.5 MPa m$^{-1/2}$.

8. The sensor of claim 1, wherein a metallic temperature sensor is fixed to a surface of the sensor body.

9. The sensor of claim 1, wherein the sensor body comprises a first portion of a differential pressure sensor and a second portion of a differential pressure sensor, separated from the first portion and connected by a metal tube.

10. The sensor of claim 9, wherein each of the first portion and the second portion includes a chamber filled with a fill fluid and isolated from a process fluid.

11. A pressure sensor comprising:
a first chamber;
a first diaphragm positioned adjacent to the first chamber, the first diaphragm and the first chamber formed of a near net shape sintered ceramic comprising at least one of aluminum oxynitride spinel and magnesium aluminate spinel.

12. The pressure sensor of claim 11 and further comprising:
a capacitance that varies as a function of deflection of the diaphragm.

13. The pressure sensor of claim 11 and further comprising:
a second chamber formed of a near net shape sintered ceramic;
wherein the first diaphragm is positioned between the first chamber and the second chamber.

14. The pressure sensor of claim 13 and further comprising:

electrodes connected to the diaphragm and the first and second chambers to provide a capacitance that varies as a function of deflection of the diaphragm.

15. The sensor of claim 11, wherein the sintered ceramic comprises a ceramic material with an elastic modulus of less than 350 GPa 50.8×10$^6$ psi) and a fracture toughness greater than 1.5 MPa m$^{-1/2}$.

16. The sensor of claim 11, and further comprising a metallic temperature sensor attached to the first chamber.

17. A pressure sensor comprising:
a sensor body;
a diaphragm supported by the sensor body and deflectable as a function of the fluid pressure, the sensor body and the diaphragm formed of near net shaped sintered ceramic comprising at least one of aluminum oxynitride spinel and magnesium aluminate spinel; and
means for producing an output representative of sensed pressure based upon deflection of the diaphragm.

18. The pressure sensor of claim 17, wherein the means for producing an output is responsive to a capacitance that changes as a function of deflection of the diaphragm.

19. The pressure sensor of claim 17, wherein the sintered ceramic comprises a ceramic material with an elastic modulus of less than 350 GPa 50.8×10$^6$ psi) and a fracture toughness greater than 1.5 MPa m$^{-1/2}$.

20. A method of forming a pressure sensor, the method comprising:
near net shape forming a sensor body and a diaphragm of sintered ceramic comprising at least one of aluminum oxynitride spinel and magnesium aluminate spinel;
machining the sensor body and the diaphragm to final dimensions; and
assembling the sensor body and the diaphragm to form the sensor.

21. The method of claim 20, wherein the sensor is assembled by brazing metallized surfaces together.

22. The method of claim 20, wherein electrical conductor, capacitor and temperature sensor patterns are applied to the ceramic parts before assembly.

23. The method of claim 20, where forming comprises one of casting, pressing or rapid prototype forming ceramic powders into shapes that are final fired into near net shapes.

24. The sensor of claim 20, wherein the sensor body and the diaphragm are assembled before firing and then co-fired to produce the sensor.

25. The method of claim 20, wherein the sintered ceramic comprises a ceramic material with an elastic modulus of less than 350 GPa 50.8×10$^6$ psi) and a fracture toughness greater than 1.5 MPa m$^{-1/2}$.

* * * * *

UNITED STATES PATENT AND TRADEMARK OFFICE
CERTIFICATE OF CORRECTION

PATENT NO. : 7,503,220 B2  
APPLICATION NO. : 11/789443  
DATED : March 17, 2009  
INVENTOR(S) : Fred Charles Sittler et al.

Page 1 of 1

It is certified that error appears in the above-identified patent and that said Letters Patent is hereby corrected as shown below:

Column 3, Line 2, delete "350 GPa (50.8x10 psi).", insert  
--350 GPa (50.8x$10^6$ psi).--

Column 4, Line 38 in Claim 7, delete "350 GPa 50.8x$10^6$ psi", insert  
--350 GPa (50.8x$10^6$ psi)--

Column 5, Line 6 in Claim 15, delete "350 GPa 50.8x$10^6$ psi)", insert  
--350 GPa (50.8x$10^6$ psi)--

Column 5, Line 24 in Claim 19, delete "350 GPa 50.8x$10^6$ psi)", insert  
--350 GPa (50.8x$10^6$ psi)--

Column 6, Line 23 in Claim 25, delete "350 GPa 50.8X$10^6$ psi)", insert  
--350 GPa (50.8x$10^6$ psi)--

Signed and Sealed this

Seventh Day of September, 2010

David J. Kappos  
*Director of the United States Patent and Trademark Office*